(12) United States Patent
Shiratori

(10) Patent No.: US 9,977,265 B2
(45) Date of Patent: May 22, 2018

(54) GLASSES TYPE INFORMATION TERMINAL, INFORMATION PROCESSING DEVICE, COMPUTER PROGRAM AND RECORDING MEDIUM

(71) Applicant: Lunettes Inc., Hyogo (JP)

(72) Inventor: Kei Shiratori, Gifu (JP)

(73) Assignee: LUNETTES INC., Hyogo (JP)

( * ) Notice: Subject to any disclaimer, the term of this patent is extended or adjusted under 35 U.S.C. 154(b) by 0 days. days.

(21) Appl. No.: 15/120,190

(22) PCT Filed: Feb. 24, 2015

(86) PCT No.: PCT/JP2015/055188
§ 371 (c)(1),
(2) Date: Aug. 19, 2016

(87) PCT Pub. No.: WO2015/125966
PCT Pub. Date: Aug. 27, 2015

(65) Prior Publication Data
US 2017/0068120 A1    Mar. 9, 2017

(30) Foreign Application Priority Data

Feb. 24, 2014 (JP) ................................. 2014-032971
Feb. 16, 2015 (JP) ................................. 2015-028069

(51) Int. Cl.
*G02C 1/00* (2006.01)
*G02C 11/00* (2006.01)
(Continued)

(52) U.S. Cl.
CPC ............... *G02C 11/10* (2013.01); *H04M 1/05* (2013.01); *H04R 1/028* (2013.01); *G02C 11/04* (2013.01)

(58) Field of Classification Search
CPC ................................. G02C 11/10; G02C 11/02
(Continued)

(56) References Cited

U.S. PATENT DOCUMENTS 6,857,739 B1     2/2005 Watson
6,997,552 B1 *   2/2006 Hung .................... G02C 11/02
                                                              351/158
(Continued)

FOREIGN PATENT DOCUMENTS

JP        2181722 A        7/1990
JP        2000111829 A     4/2000
(Continued)

OTHER PUBLICATIONS

International Search Rpeort for corresponding PCT Application No. PCT/JP2015/055188, 4 pages, dated May 12, 2015.
(Continued)

*Primary Examiner* — Hung Dang
(74) *Attorney, Agent, or Firm* — Matthew B. Dernier, Esq.

(57) ABSTRACT

Provided is a glasses type information terminal, which is not only configured to deliver information to a wearer without hindering everyday activities, but is also capable of easily delivering an intention or the like of the wearer to a surrounding area. Chip LEDs capable of selectively emitting a plurality of colors of light are arranged on a glasses frame. The chip LEDs are configured to radiate light toward an end portion of glasses lenses. A control module and a communication module configured to perform near field communication to and from a mobile terminal that generates personalized information on the wearer are accommodated in the glasses frame. The control module is configured to perform light emission control of the chip LEDs based on information from the mobile terminal.

12 Claims, 12 Drawing Sheets

(51) Int. Cl.
*H04M 1/05* (2006.01)
*H04R 1/02* (2006.01)
*G02C 11/04* (2006.01)

(58) Field of Classification Search
USPC ............... 351/158, 41; 362/13, 15, 800, 103
See application file for complete search history.

(56) References Cited

U.S. PATENT DOCUMENTS

| | | | |
|---|---|---|---|
| 7,175,273 B2* | 2/2007 | Lee | G02C 11/02 |
| | | | 351/158 |
| 7,792,552 B2* | 9/2010 | Thomas | G02C 11/06 |
| | | | 455/556.1 |
| 8,188,880 B1 | 5/2012 | Chi et al. | |
| 8,514,097 B2 | 8/2013 | Boise | |
| 2007/0200998 A1 | 8/2007 | Schrimmer | |
| 2010/0118139 A1 | 5/2010 | Huang et al. | |
| 2013/0201285 A1* | 8/2013 | Mao | G01B 11/026 |
| | | | 348/46 |

FOREIGN PATENT DOCUMENTS

| | | | |
|---|---|---|---|
| JP | 2003289484 A | 10/2003 | |
| JP | 2007052224 A | 3/2007 | |
| JP | 2011229024 A | 11/2011 | |

OTHER PUBLICATIONS

European Search Report for corresponding EP Application No. 15752231, 8 pages, dated Sep. 25, 2017.

* cited by examiner

FIG. 5

| PATTERN ID | LED #1 | LED #2 | LED #3 | LED #4 | LED #5 | LED #6 | BLINKING PATTERN | | | | | SOUND SOURCE PATTERN | | | | | | MESSAGE PATTERN | | | | | | LINK |
|---|---|---|---|---|---|---|---|---|---|---|---|---|---|---|---|---|---|---|---|---|---|---|---|---|
| | | | | | | | 0 | 1 | 2 | 3 | 4 | 0 | 1 | 2 | 3 | 4 | 5 | 0 | 1 | 2 | 3 | 4 | 5 | |
| A-001 | L1 | X | L1 | L1 | X | L1 | O | | | | | O | | | | | | O | | | | | | |
| A-002 | L2 | X | L2 | L2 | X | L2 | O | | | | | O | | | | | | O | | | | | | |
| A-003 | L3 | X | L3 | L3 | X | L3 | O | | | | | O | | | | | | O | | | | | | |
| ... | | | | | | | | | | | | | | | | | | | | | | | | |
| B-001 | X | L1 | X | X | L1 | X | | O | | | | O | | | | | | O | | | | | | |
| B-002 | X | L2 | X | X | L2 | X | | O | | | | O | | | | | | O | | | | | | |
| B-003 | X | L3 | X | X | L3 | X | | O | | | | O | | | | | | O | | | | | | |
| ... | | | | | | | | | | | | | | | | | | | | | | | | |
| C-001 | X | L1,L3 | X | X | L1,L3 | X | | | O | | | O | | | | | | O | | | | | | |
| ... | | | | | | | | | | | | | | | | | | | | | | | | |
| N-001 | X | L4 | X | X | L1 | X | | | | O | | | | O | | | | | | | | | | |
| ... | | | | | | | | | | | | | | | | | | | | | | | | |
| Y-001 | X | X | X | X | X | X | O | | | | | O | | | | | | | | | O | | | |

| CHANGE ID \ CONTROL PATTERN | LED#1 | LED#2 | LED#3 | LED#4 | LED#5 | LED#6 | SOUND SOURCE | LINK |
|---|---|---|---|---|---|---|---|---|
| KA-001 | -a | x | -a | -a | x | -a | x | |
| KA-002 | -b | x | -b | -b | x | -b | x | |
| ... | | | | | | | | |
| KB-001 | x | -a | x | x | -a | x | x | |

| APP-ID | PATTERN ID | CHANGE ID | ... |
|---|---|---|---|
| APP-05 | B-001 | KB-001 | ... |
| APP-08 | B-003 | KB-002 | ... |
| APP-10 | C-001 | KB-001 | ... |
| ... | | | |

```
<Main      Setting          | 1101
                            | 1102
☐ Call              Off>
☐ Mail              On>
☐ Social            Off>
☐ Calendar          Off>
☐ Finance           Off>
☐ Weather           Off>

☐ Timer             On>
☐ Tempo             On>
☐ Relax             On>
☐ SOS               Off>
☐ Party             Off>
☐ Morse Code        Off>
☐ Disco             Off>
```

FIG. 11

GLASSES TYPE INFORMATION TERMINAL, INFORMATION PROCESSING DEVICE, COMPUTER PROGRAM AND RECORDING MEDIUM

TECHNICAL FIELD

The present invention relates to a glasses type information terminal capable of delivering information to a wearer based on signal light and sound as well as sending out information to a surrounding area of the wearer, and an information processing device and components thereof configured to operate in cooperation with the glasses type information terminal.

BACKGROUND ART

In recent years, there has been proposed a glasses type information terminal configured to represent information based on a sensation of wearing ordinary glasses. For example, in the eye mount video display device disclosed in Patent Literature 1, a liquid crystal display panel is arranged at a portion corresponding to a glasses lens, and the liquid crystal display panel is configured to be connected to a computer device. Further, in the video display device disclosed in Patent Literature 2, light having a brightness that has been changed in accordance with an input video signal is converted into beam light. The beam light is two-dimensionally scanned, and the scanned beam light is guided to an eyeball of the wearer via an integrated mirror arranged at a site corresponding to a glasses lens.

In both the device disclosed in Patent Literature 1 and the device disclosed in Patent Literature 2, a display panel for displaying an image or video (hereinafter referred to as "image") is formed, or appears to the wearer as if it is formed, on a site corresponding to the glasses lens. Therefore, a processing module for image processing and an optical mechanism for displaying the image are required, which not only place a burden on the body of the wearer, but also appear weird to a person seeing the wearer. Normally, a person cannot directly view the image with one eye and the surrounding area of the person with another eye. Therefore, the wearer of a related-art glasses type information terminal such as that disclosed in Patent Literature 1 or 2 may be unable to concentrate on his or her surrounding area when the image is displayed, and hence his or her everyday activities may be hindered.

As a technology for solving such a problem, in the head-worn information notification device disclosed in Patent Literature 3, a display unit is arranged at a position inside a field of view of a user and outside the field of view visible through the glasses lens when the user wears the glasses, and reception of information is notified to the user via light emitted by the display unit.

CITATION LIST

Patent Literature

[PTL 1] JP 2003-289484 A
[PTL 2] JP 2000-111829 A
[PTL 3] JP 2011-229024 A

SUMMARY OF INVENTION

Technical Problem

A method of notifying information that produces a sense of discomfort in the surrounding area is limited in terms of its usable environment. Thus, the head-worn information notification device disclosed in Patent Literature 3 is configured to notify reception of information only to the user, and to prevent the reception of information from being perceived in the surrounding area. Therefore, there is a disclosure that it is necessary for a light-emitting unit to be arranged in a region from about 68 degrees to about 100 degrees on the ear side with respect to a visual axis of the user. Further, there is also a disclosure that it is necessary for the light-emitting unit to be configured so as to have directivity, and for an irradiated region of exit light to be a region enclosed by the portions at both end surfaces of the head of the user (wearer) as viewed from an exit portion, namely, to be a region in which irradiation light is blocked by the head.

However, each wearer has a different field of view and range of view. Therefore, glasses frames in which the position of the light-emitting unit is fixedly determined cannot be mass produced, and hence glasses frames are so-called special order products. As a result, it is difficult to reduce manufacturing costs. In the case of weak light that is not perceived in the surrounding area, such light may also not be perceived by the wearer himself or herself. This is particularly the case when the attention of the wearer is focused on his or her range of view in front, such as during walking (traveling), or when the eyes of the user are shut. Further, because the light is emitted at a position away from the wearer, there is always an influence by the emitted light. As a result, it is difficult to build glasses frames for which emitted light is not perceived in the surrounding area. Rather than building such glasses frames, enabling information from the wearer to be sent out even to the surrounding area via emitted light is expected to lead to an increase in the demand and uses of this kind of glasses type information terminal.

It is a main object of the present invention to provide a glasses type information terminal capable of not only delivering to the wearer information for the wearer without hindering everyday activities, but also of sending out information from the wearer even to the surrounding area.

Another object of the present invention is to provide an information processing device suited to being in cooperation with the above-mentioned glasses type information terminal, and a computer program and a recording medium for implementing such an information processing device.

Solution to Problem

According to one embodiment of the present invention, there is provided a glasses type information terminal, including: a glasses frame configured to hold a glasses lens; a light-emitting source of signal light; and a control module configured to perform, when triggered by input of information representing a light emission mode of the signal light, light emission control of the light-emitting source based on the information, the glasses type information terminal being configured such that a signal light of the light emission mode is propagated from the light-emitting source toward at least one of the glasses frame and an edge surface of the glasses lens.

Further, according to one embodiment of the present invention, there is provided an information processing device, including: communication means for performing communication to and from the glasses type information terminal; monitoring means for monitoring an execution situation of a loaded application; setting means for setting a light emission mode of the light-emitting source in accordance with the monitored execution situation; and control means for generating the light emission control information based on content set by the setting means, and transmitting the generated light emission control information to the glasses type information terminal via the communication means.

Further, according to one embodiment of the present invention, there are provided a computer program for causing a computer including a communication function to operate as the information processing device, and a recording medium having the computer program stored thereon.

Advantageous Effects of Invention

The glasses type information terminal according to the one embodiment of the present invention is configured to propagate signal light from a light-emitting source toward an edge surface of a glasses lens or a glasses frame. As a result, information may be delivered to the wearer via the signal light without impairing the range of view of the wearer. Further, information from the wearer can be sent out to the surrounding area by using light that has reached the glasses frame or an edge surface of the glasses lens.

According to the information processing device of the present invention, the content of the representation of information by the glasses type information terminal is capable of being set at a position away from the glasses type information terminal.

BRIEF DESCRIPTION OF DRAWINGS

FIG. 5 is an explanatory diagram of a content example of an association table.

FIG. 11 is an explanatory diagram of a selection screen of the APP to be set.

DESCRIPTION OF EMBODIMENTS

An embodiment of the present invention is now described with reference to the drawings. In this embodiment, an example is described of a case in which a user carrying a mobile terminal, which is an example of an information processing device, uses a glasses type information terminal by wearing the glasses type information terminal on his or her head. Such a user is referred to as a "wearer". The mobile terminal is a computer, such as a smartphone, a tablet terminal, or a laptop computer. From the perspective of the glasses type information terminal, the mobile terminal is an external device. A plurality of types of applications (services implemented by execution of an application program; hereinafter referred to as "APP") are loaded (installed) in the mobile terminal in advance. In the following description, for convenience, the mobile terminal is a smartphone.

Glasses Type Information Terminal

Figure 1A:
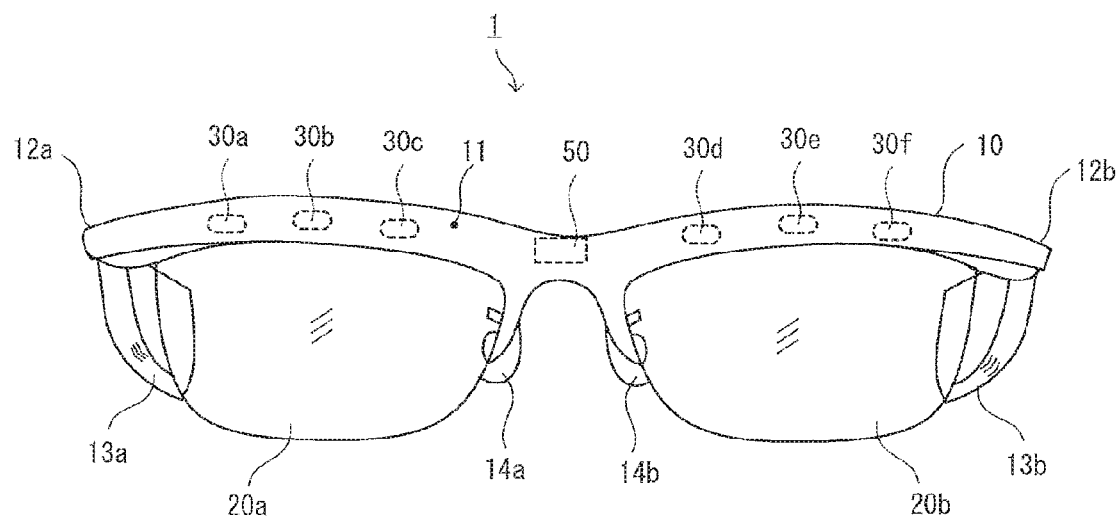
FIG. 1A is a front view of a glasses type information terminal according to an embodiment of the present invention.
Figure 1B:
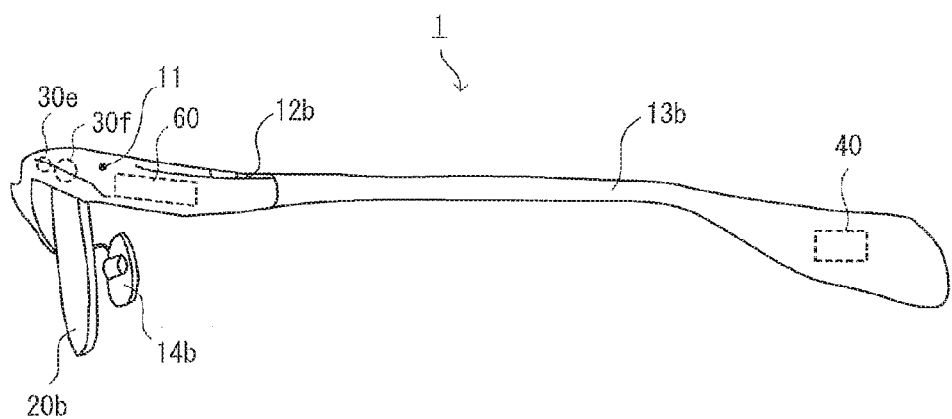
FIG. 1B is a side view of the glasses type information terminal.
Figure 2A:
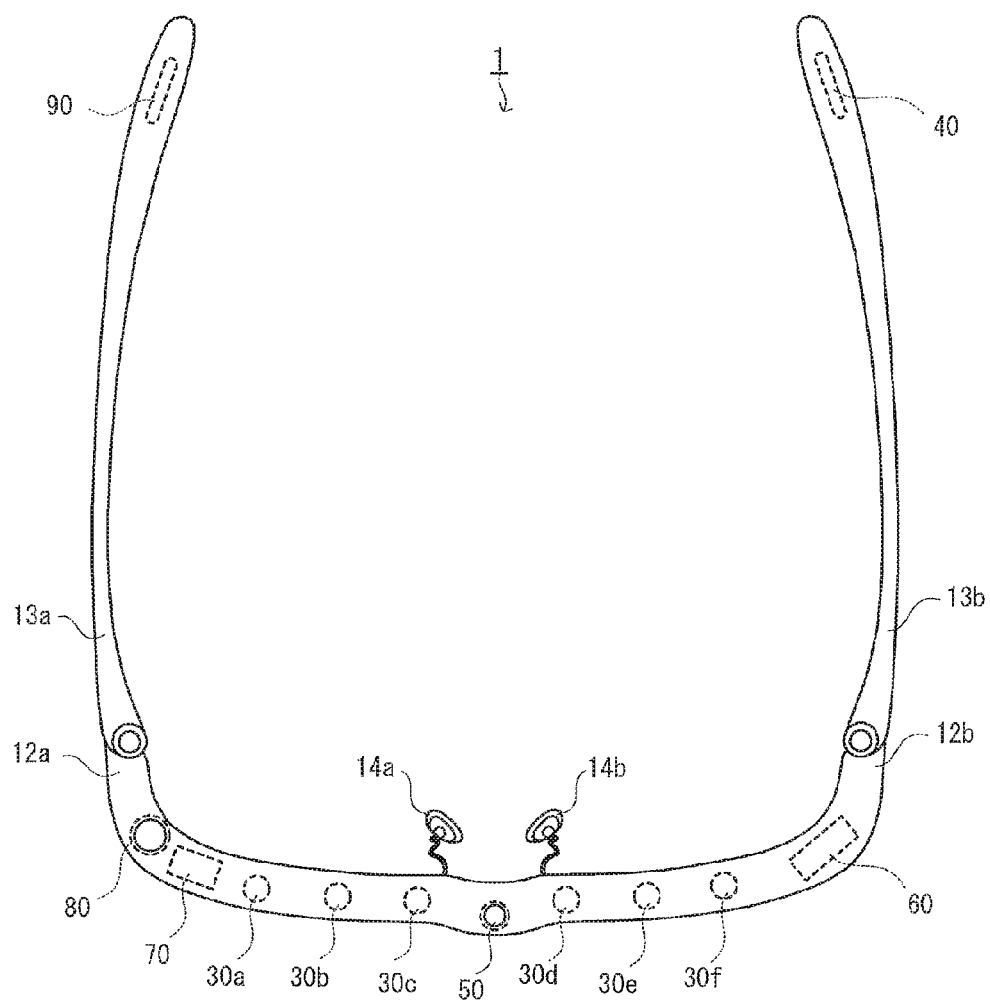
FIG. 2A is a top view of the glasses type information terminal.
Figure 2B:
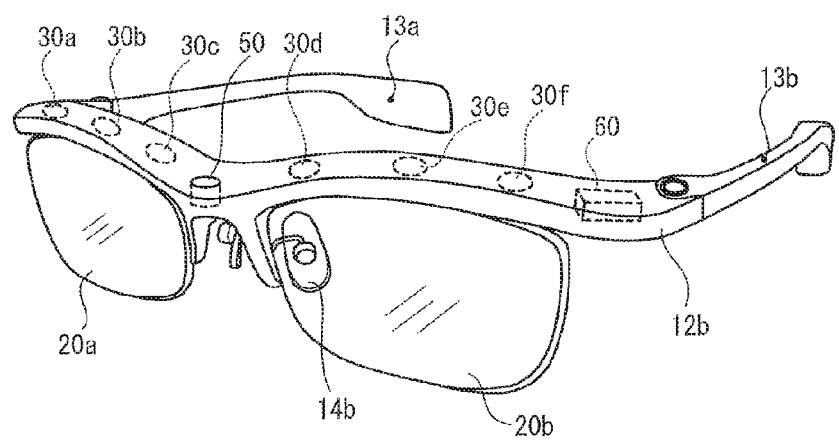
FIG. 2B is a perspective view of the glasses type information terminal.

First, a configuration example of a glasses type information terminal 1 is described. FIG. 1A is a front view of the glasses type information terminal according to this embodiment, and FIG. 1B is a side view of the glasses type information terminal. FIG. 2A is a top view of the glasses type information terminal, and FIG. 2B is a perspective view of the glasses type information terminal.

The glasses type information terminal 1 includes a glasses frame 10. The glasses frame 10 is built from a color-emitting member. Various types of electronic components are accommodated in the glasses frame 10. The color-emitting member is a member configured to emit a color in accordance with the color of input light. A translucent resin, such as acrylic, that emits a milky-white color, a specific achromatic color or chromatic color, or a mixed color thereof, may be used for the color-emitting member. Wearing the glasses type information terminal 1 has the same meaning as wearing the glasses frame 10.

The glasses frame 10 includes a rim 11 configured to hold a part of an upper edge portion and a side end portion of each of a pair of left and right glasses lenses 20a and 20b. In the rim 11, a pair of grooves, referred to as rim lines, are dug into a edge surface that is on a lower side when the glasses frame 10 is worn and a side edge surface closer to the center. An upper edge surface of the glasses lenses 20a and 20b is fitted into those grooves, and the glasses lenses 20a and 20b are held by the elasticity of the rim 11. The glasses lenses 20a and 20b may also be fixed to the rim 11 by applying an adhesive to those edge surfaces. Temple portions (also referred to as arms or cranes) 13a and 13b are respectively attached to left and right end pieces 12a and 12b of the rim 11 via a hinge. The tips of the temple portions 13a and 13b are integrally formed in the shape of ear pads, which are referred to as "ear pieces". Nose pads 14a and 14b for sitting on the nose of the wearer are also formed on the rim 11. The nose pads 14a and 14b are each joined to the rim 11 by part referred to as a pad arm.

Typical glasses lenses used in everyday activities by the wearer may be used for the glasses lenses 20a and 20b. Specifically, the glasses type information terminal 1 is completed by the wearer procuring glasses lenses for himself or herself, and mounting those glasses lenses in the glasses frame 10.

Various electronic components are accommodated in the glasses frame 10 at sites indicated by the dashed lines in FIGS. 1A, 1B, 2A and 2B. One of the electronic components is color chip light-emitting diodes (LEDs) 30a, 30b, 30c, 30d, 30e, and 30f, which are each independently capable of light emission control. When it is not particularly necessary to distinguish among those color chip LEDs, the color chip LEDs are abbreviated as chip LEDs 30. Specifically, the chip LEDs 30 are each a light-emitting device capable of emitting color light in one or more colors. For example, multicolor light can be emitted by mounting on one chip LEDs in the three primary colors, namely, red, blue, and yellow, and selectively driving any one of those colors or two or more of those colors at a predetermined light intensity. As such chip LEDs 30, for example, "LL-S197BRGBC", manufactured by the Chinese company Lucky Light Electronic Co., Ltd., may be used.

In this embodiment, the chip LEDs 30 are used as a light-emitting source configured to emit signal light in a predetermined direction in cooperation with an opening 111b, which is described later. The term "signal light" refers to light representing information. Regardless of whether the light is blinking light or is continuous light, as long as the light includes information, such light may be considered to be signal light. Three chip LEDs 30 are arranged for each of the left and right glasses lenses 20a and 20b at a portion slightly above the grooves formed in the rim 11. As a result, multicolor light may be emitted in accordance with the information.

In this embodiment, in addition to the chip LEDs 30, a piezoelectric speaker 40, an environment sensor 50, a communication module 60, a control module 70, a switch 80, and a battery 90 are used as electronic components. Those electronic components are also accommodated in predetermined sites of the glasses frame 10.

The piezoelectric speaker 40 is arranged on an inner side of the ear piece of the temple portion 13b, namely, at a site directing to the ear of the wearer. In FIGS. 1A, 1B, 2A and 2B, an example is illustrated in which one piezoelectric speaker 40 is used. However, the piezoelectric speaker 40 may also be arranged on the temple portion 13a as well. Ultra-compact products 0.5 [mm] thin and about 1 [mm] square are currently being sold, and hence such a product may be used.

The environment sensor 50, which is a sensor configured to detect a change in a surrounding environment of the glasses frame 10, is arranged near a center portion of the rim 11. As the environment sensor 50, any one of, or a combination of, an acceleration sensor, an air pressure sensor, a temperature sensor, a humidity sensor, a distance sensor, and an illuminance sensor may be removably mounted. In this embodiment, the description is based on the assumption that an illuminance sensor is used as the environment sensor 50.

The communication module 60 uses a multi-purpose module configured to use near field communication based on "Bluetooth". Near field communication is a communication standard that uses a small amount of power and that has been determined in accordance with international standards. In this embodiment, the reason why near field communication is employed is in order to avoid interference with another information terminal. The reason why "Bluetooth" is employed is because with the reductions in module size, modules using "Bluetooth" are more suited to being accommodated in the glasses frame 10. However, near field communication other than "Bluetooth", for example, infrared communication, may also be employed. In cases in which there is no risk of interference, a communication module configured to employ wireless communication other than near field communication or wired communication may also be used.

The control module 70 is described later. The switch 80 is a switch for stopping and restarting operation of the chip LEDs 30 and the piezoelectric speaker 40. The battery 90 is, for example, a lithium ion battery or a button battery. An adjustment button (not shown) configured to adjust the light intensity of the chip LEDs 30 or a volume level of the piezoelectric speaker 40 is also arranged.

Each of the electronic components is mounted to the glasses frame 10 via one or a plurality of film-like circuit boards on which a wiring pattern is formed. The circuit boards between the rim 11 and the pair of temple portions 13a and 13b are connected to each other by individual wires. As a result, an electronic circuit is formed over the overall glasses frame 10. Each electronic component has a horizontal size and a vertical size of about 0.5 [mm] to about 5 [mm], or less. As a result, even when those electronic components are accommodated, compared with an ordinary glasses frame in which electronic components such as those of this embodiment are not mounted, a glasses frame 10 can be achieved that is compact, lightweight, and does not appear weird to the wearer or to a third party.

Figure 3:
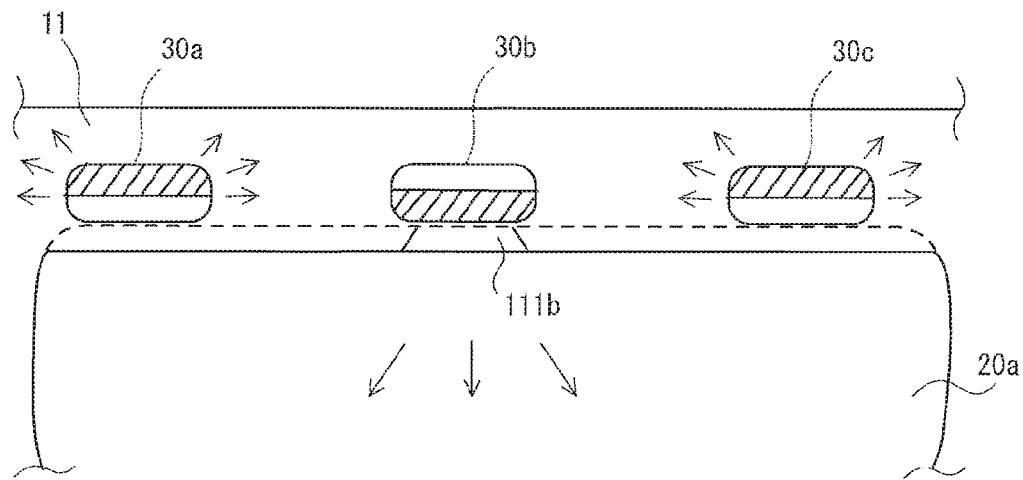
FIG. 3 is an enlarged partial view of a rim on a right eye portion of a wearer.

A structure of the light-emitting source is now described with reference to FIG. 3. FIG. 3 is an enlarged partial view of the rim 11 on a right eye portion of the wearer. Among chip LEDs 30a, 30b, and 30c, a light-emitting surface (surface emitting light) of the chip LED 30b in the center faces an edge surface of a peripheral edge of the glasses lens 20a. The light-emitting surfaces of the chip LEDs 30a and 30c on either side of the chip LED 30b face in the opposite direction to the chip LED 30b. In the rim 11, the opening 111b configured to form the emitted light into a beam and to determine the emission direction of the light is formed in a portion for housing the center chip LED 30b. The opening 111b is formed in a shape directing to an edge surface that, of the edge surface of the glasses lens 20b, is slightly lower than the eye level of the wearer. In general, regardless of what type of glasses lens is held, the angle with respect to the glasses frame is almost constant. As a result, there is no problem even if, like in this embodiment, the opening 111b is formed in advance in the manner described above. In other words, the signal light emitted from the chip LED 30b is propagated toward the above-mentioned edge surface even when an arbitrary glasses lens selected by the wearer is held in the glasses frame 10.

A main role of the chip LEDs 30a and 30c that are not in the center is to change the coloration of the glasses frame 10. Therefore, the light-emitting surfaces of the chip LEDs 30a and 30c are arranged so as to emit light toward an inner portion of the glasses frame 10. In FIG. 3, an example is illustrated in which, when the glasses frame 10 is worn, the chip LEDs 30a and 30c are in a direction directing directly upward. However, this is merely one example. Obviously, depending on the shape of the rim 11, when the glasses frame 10 is worn, the chip LEDs 30a and 30c may be also arranged at a slight angle from the horizontal. The light emitted by the light-emitting surfaces of the chip LEDs 30a and 30c is propagated while being repeatedly reflected in the inner portion of the rim 11. During that process, the rim 11 emits a color. That light is also propagated to the temple portions 13a and 13b. Specifically, the overall glasses frame 10 can be changed from its original color. When a fluorescence agent is mixed in the glasses frame 10, there are advantages in that a light emission quantity is increased and synthesis of a desired color is easier.

The edge surface of the glasses lens 20a becomes a scattering surface during lens processing. As a result, even when a specific mechanism such as a reflection mirror is not arranged, the light that has reached the edge surface of the glasses lens 20a arrives at the eye of the wearer via the light propagating through the edge surface and the surface of the glasses lens 20a. It is easier for a person to look below eye level than above eye level. Therefore, even when the light intensity of the signal light is small, information can be delivered to the wearer at least via the edge surface lower than eye level. A display mode in which the signal light blinks is also possible. In this case, even when the wearer is focused on a task, or is walking or running, the signal light can be reliably delivered. In whichever case, because the signal light only travels toward the edge surface of the glasses lens 20a, the range of view of the wearer is not impaired.

FIG. 3 is an illustration of a structure of the rim 11 of the right eye portion of the wearer. However, the left eye portion of the rim 11 also has the same structure. The shape of the opening 111b may be appropriately changed in accordance with the shape and structure of the chip LED 30b, in particular, the light-emitting surface of the chip LED 30b. In the following description, when it is not necessary to distinguish between the glasses lenses 20a and 20b, those parts are referred to as "glasses lenses 20".

Figure 4:
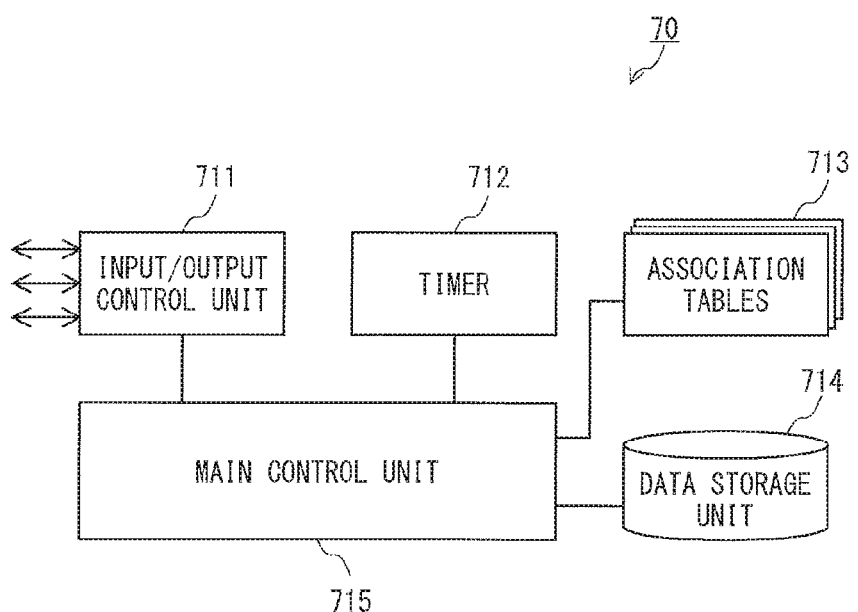
FIG. 4 is a function configuration diagram of a control module.

Next, a function example to be implemented in the glasses type information terminal 1 is described. Each function is implemented by the control module 70 operating in a lead role. In this embodiment, the control module 70 is built from a processor, a computer program, and firmware loaded with digital data. For this type of firmware, a small-scale complex programmable logic device (CPLD), a field-programmable gate array (FPGA), may be used. A function configuration example of the control module 70 is illustrated in FIG. 4. The control module 70 includes an input/output control unit 711, a timer 712, a plurality of association tables 713, a data storage unit 714, and a main control unit 715 configured to control operation of each unit in an integrated manner.

The input/output control unit 711 is configured to control input and output of information to and from the main control unit 715 and the chip LEDs 30, the piezoelectric speaker 40, the environment sensor 50, and the communication module 60. The timer 712 is configured to output a measurement result of the current time to the main control unit 715. The timer 712 is used to, for example, determine the time and to determine a start and an end of a time period. The association tables 713 are tables configured to show drive patterns of the chip LEDs 30 and the piezoelectric speaker 40 by the main control unit 715. The drive patterns are set in accordance with various control information. The control information described in this embodiment is as follows.

(a) Light emission control information (received from a smartphone) representing a light emission mode of the light-emitting source determined in accordance with an execution situation of an APP loaded in the smartphone.

(b) Light emission control information (second light emission control information) representing the light emission mode of the light-emitting source determined in accordance with a detection result of the environment sensor 50.

(c) Light emission control information (third light emission control information: received from smartphone) representing the light emission mode of the light-emitting source determined in accordance with the detection result of the environment sensor 50.

(d) Sound control information (received from smartphone) representing an output mode of a sound to be produced by the piezoelectric speaker 40 by using sound source data.

In the following description, when it is not necessary to distinguish among the various pieces of control information, the various control information is collectively referred to as "action information". The action information is unique to the wearer. The content of the action information may be freely set and changed as appropriate by the wearer or a concerned party via the smartphone, for example. The setting and changing methods are described in detail later.

Figures 6, 7, 8:
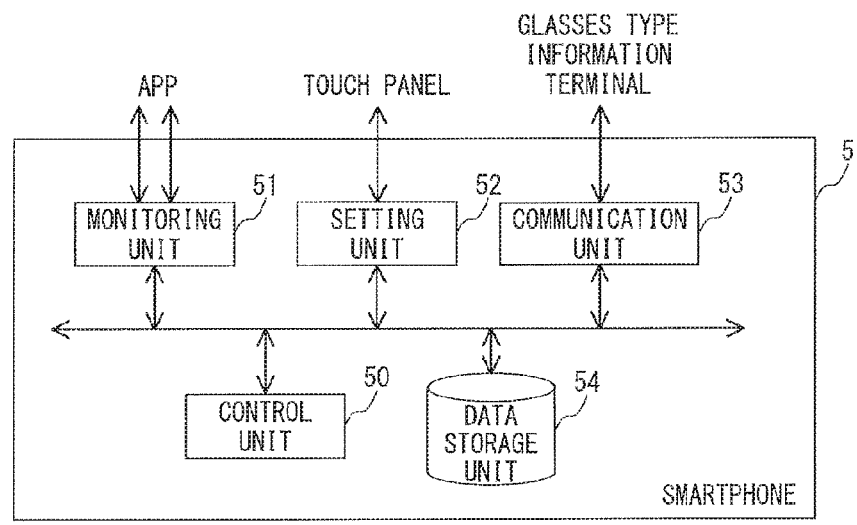
FIG. 6 is an explanatory diagram of a content example of the association table.
FIG. 7 is an explanatory diagram of a content example of a table stored in a data storage unit.
FIG. 8 is a function configuration diagram of an information processing device.

In this case, "emission mode of the light-emitting source" refers to, for example, an emission color (a combination in the case of mixed colors) achieved by controlling a drive timing of the chip LEDs 30, whether or not the light is blinking, or a blinking pattern (such as period, duration). Flashing is also one mode of a blinking pattern. Further, "output mode of a sound" refers to, for example, whether or not there is sound source data to be used in order to drive the piezoelectric speaker 40, a sound source pattern (whether or not the sound is intermittent, or a combination of sound source data), and a message pattern (a combination of sound source data). The message pattern may include patterns of combinations of synthetic speech. Content examples of the association tables 713 of this embodiment are shown in FIG. 5 to FIG. 7.

In the example shown in FIG. 5, for each record, a pattern identification (ID) is associated with the type (color) of light to be used, the blinking pattern, the sound source pattern, and the message pattern. Through identifying any one of the pattern IDs, at least one of the light emission mode and the output mode can be identified. The main control unit 715 is configured to control the chip LEDs 30 and the piezoelectric speaker 40 based on the content of the identified pattern ID. In FIG. 5, "LED #1" corresponds to the chip LED 30a, "LED #2" corresponds to the chip LED 30b, "LED #3" corresponds to the chip LED 30c, "LED #4" corresponds to the chip LED 30d, "LED #5" corresponds to the chip LED 30e, and "LED #6" corresponds to the chip LED 30f.

The symbol "×" indicates that the relevant chip LED 30 is not driven. The symbols "L1", "L2", and "L3" each indicate a different emission color of the chip LEDs 30. "L1, L3" represents a mixed color. In "Blinking Pattern", the symbol "○" indicates the blinking pattern of the LED #1 to LED #6, and the numeral "0" indicates that blinking is not performed, namely, the chip LEDs 30 are caused to emit bursts of light as a result of the chip LEDs 30 being driven for a given duration. The blinking patterns "1" to "4" each have a different blinking interval or speed.

For example, the pattern ID "A-001" of FIG. 5 indicates that all of "LEDs #1, #3, #4, and #6" are "L1", namely, all of the chip LEDs 30a, 30c, 30d, and 30f continuously emit the color corresponding to L1 (e.g., green). In "Sound Source Pattern" and "Message Pattern", the symbol "○" indicates the pattern to be output, and the numeral "0" indicates that sound source data is not used (sound is not output). The sound source patterns "1" to "5" and the message patterns "1" to "5" are each a combination pattern of different sound source data or different messages. The other pattern IDs, chip LEDs 30, and the piezoelectric speaker 40 also have a similar content. Associating the type (color) of light to be used, the blinking pattern, the sound source pattern, and the message pattern by a pattern ID for each record in this manner simplifies the control performed when the chip LEDs 30 and the piezoelectric speaker 40 are combined (because only the pattern ID needs to be identified). The pattern IDs may be added to, changed, or deleted.

In FIG. 6, an example is shown of the light emission mode and the output mode controlled in accordance with the detection result of the environment sensor 50. The light emission mode and the output mode are associated with a change ID. The change ID represents, when the illuminance sensor is used as an example, a level of illuminance change of the surrounding area of the glasses type information terminal 1. In the change ID, a reference range of each illuminance change is set. The change IDs are set so that when the illuminance change is in a given reference range, the change ID is "KA-001", and when the illuminance change is more than the reference range, the change ID is "KA-002", for example. As an example, when the illuminance change is a change by an amount corresponding to the change ID "KA-001", among the chip LEDs 30, the light intensity of the LED #1, the LED #3, the LED #4, and the LED #6 (chip LEDs 30*a*, 30*c*, 30*d*, and 30*f*) is changed by −a (lux). The symbol "×" in "Sound Source" indicates that no sound or message is output from the piezoelectric speaker 40. When a sound or a message is to be output, the symbol "○" is set. In such a case, as shown in FIG. 5, any one of "1" to "5" is selected.

The change ID may be added to, changed, or deleted.

In FIG. 7, an example of the control content for each APP is shown. The "APP-ID" represents the ID of each APP that is loaded in the smartphone and that is set so that the execution situation of the APP can be monitored. The "Pattern ID" represents the content shown as an example in FIG. 5. The "Change ID" is, for example, KA-001 shown as an example in FIG. 6. In the example shown in FIG. 7, this means that for a given APP (APP-05), with the light emission mode and the output mode identified by the pattern ID "B-001" as a base, the light intensity is adjusted based on the pattern identified by the change ID "KB-001". It is not always the case that the APP-ID (FIG. 7) includes a pattern ID (FIG. 5) and a change ID (FIG. 6), and the APP-ID may include only a pattern ID. In another case, another pattern (ID) may also be added to the APP-ID.

Returning to FIG. 4, the digital data required by the main control unit 715 to implement the light emission mode of the chip LEDs 30 and the output mode of the piezoelectric speaker 40, and the setting content of each APP, are stored in the data storage unit 714. The digital data is, for example, a control parameter for light emission control based on a specification of the chip LEDs 30, and a plurality of types of sound source data for determining the content of the sound to be output from the piezoelectric speaker 40. The sound source data may also be synthetic speech for building message data. The digital data is obtained from the smartphone, for example, and stored.

One operation of the main control unit 715 is performing light emission control of the chip LEDs 30 and output control of the piezoelectric speaker 40 in accordance with the execution situation of an APP loaded in the smartphone or the detection result of the environment sensor 50. Those controls are performed based on the action information. In the case of monitoring the execution situation of an APP loaded in the smartphone, the action information is received from the smartphone that generated the action information via the communication module 60. Regarding the second light emission control information and warning information, such information is not received from the smartphone, but it is generated by the main control unit 715 itself. The content corresponding to the association tables 713 shown as examples in FIG. 5 to FIG. 7 is also included in the smartphone. Therefore, in this embodiment, the real action information received from the smartphone is the APP-ID shown in FIG. 7. Regarding the action information (second light emission control information, for example) that has no relation to the execution situation of the smartphone, a fixed APP-ID is set for such action information in advance by the smartphone.

The main control unit 715 is configured to identify the pattern ID (FIG. 5) and the change ID (FIG. 6) based on the acquired action information (APP-ID: FIG. 7). The chip LEDs 30 and the piezoelectric speaker 40 are driven via the input/output control unit 711 by using, among the digital data stored in the data storage unit 714, the control parameter and so on.

Smartphone

Next, the configuration of the smartphone, which is an example of the mobile terminal (external device), is described. The smartphone is a known mobile computer including, for example, a communication function, such as data communication and telephone calls using a public telecommunications network, an information display function, such as a display, an information input function, such as a keyboard, sound source data, and a speaker. The information display function and the information input function may be implemented by a touch panel. The communication function includes, in addition to typical communication via a public telecommunications network, a function for performing one-to-one near field communication to and from the glasses type information terminal 1.

In this embodiment, characteristic functions are implemented by loading in the smartphone a computer program for APP monitoring from a computer-readable recording medium in which the computer program is recorded, and executing that computer program. FIG. 8 is a configuration diagram of the function blocks implemented in the smartphone. A smartphone 5 is configured to function as a control unit 50, a monitoring unit 51, a setting unit 52, a communication unit 53, and a data storage unit 54 that those function blocks refer to as appropriate. In this embodiment, the communication unit 53 is configured to perform, similar to the glasses type information terminal 1, near field communication based on "Bluetooth". The data storage unit 54 is configured to store, for example, information on the glasses type information terminal 1, which is the other party in the near field communication, and tables including the same content as the association tables 713 (FIG. 5 to FIG. 7) included in the glasses type information terminal 1. The content of the tables is synchronized at a point when near field communication to and from the glasses type information terminal 1 has been enabled by the communication unit 53.

The monitoring unit 51 is configured to monitor the execution situation of an APP loaded in the smartphone. The APP to be monitored is freely determined by the wearer, and the ID of that APP (APP-ID) is set in the tables in the data storage unit 54. In this embodiment, an example is illustrated in which the execution situation of the APP is a call notification, a mail notification, a message exchange service notification, a notification of various information guidance, and relaxation. Each notification is detected as one execution situation of an APP already loaded in the smartphone, such as a mail APP, an internet communication APP, and not as an execution situation of the communication unit 53.

The setting unit 52 is configured to set the light emission mode of the chip LEDs 30 and/or the output mode of the piezoelectric speaker 40 to be determined in accordance with the execution situation of the APP monitored by the monitoring unit 51. Specifically, a setting screen is displayed on the touch panel, and setting content input by a touch operation or the like is transmitted to the control unit 50.

The control unit 50 is configured to create or update the content of the tables stored in the data storage unit 54 based on the content set by the setting unit 52. The action information is generated based on the monitoring result of the execution situation of the APP by the monitoring unit 51. The generated action information is transmitted to the glasses type information terminal 1 via the communication unit 53. The control unit 50 is configured to refer to the tables in the data storage unit 54 when generating the action information. In this embodiment, by the time that the APP to be monitored is set, the control unit 50 has grasped the APP-ID for that APP. Therefore, in this embodiment, the APP-ID (or with accompanying information) may be generated as the action information, and the generated APP-ID may be transmitted to the glasses type information terminal 1.

Next, a cooperative operation example between the smartphone 5 and the glasses type information terminal 1 is described in detail.

Figure 9:
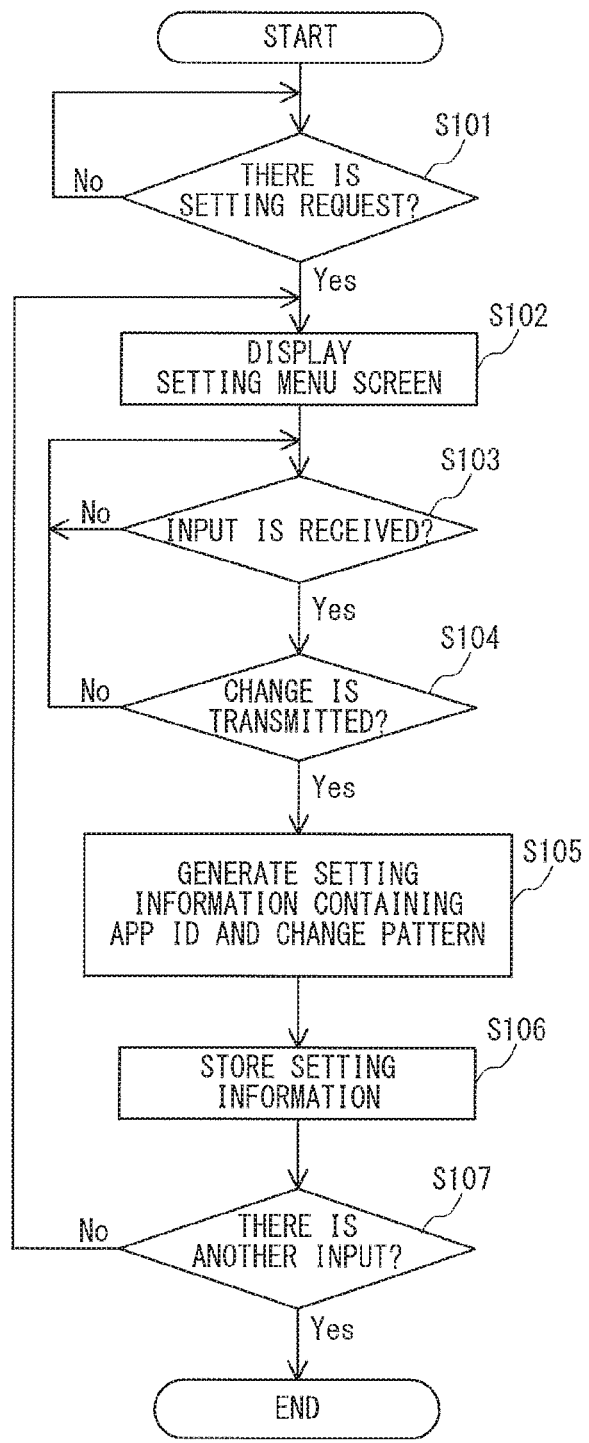
FIG. 9 is a setting procedure explanatory diagram of an APP to be monitored.

FIG. 9 is a procedure explanatory diagram when setting an APP whose execution situation is to be monitored. When a setting request from the wearer of the glasses type information terminal 1 is input (Step S101: Yes), the setting unit 52 displays a setting menu screen 1001 illustrated in FIG. 10 on the touch panel (Step S102). On the setting menu screen 1001, icons of the APPs already set as an APP whose execution situation is to be monitored, and a "setting" icon 1002 for enabling a new setting or already-set content to be changed, are displayed.

Figure 10:
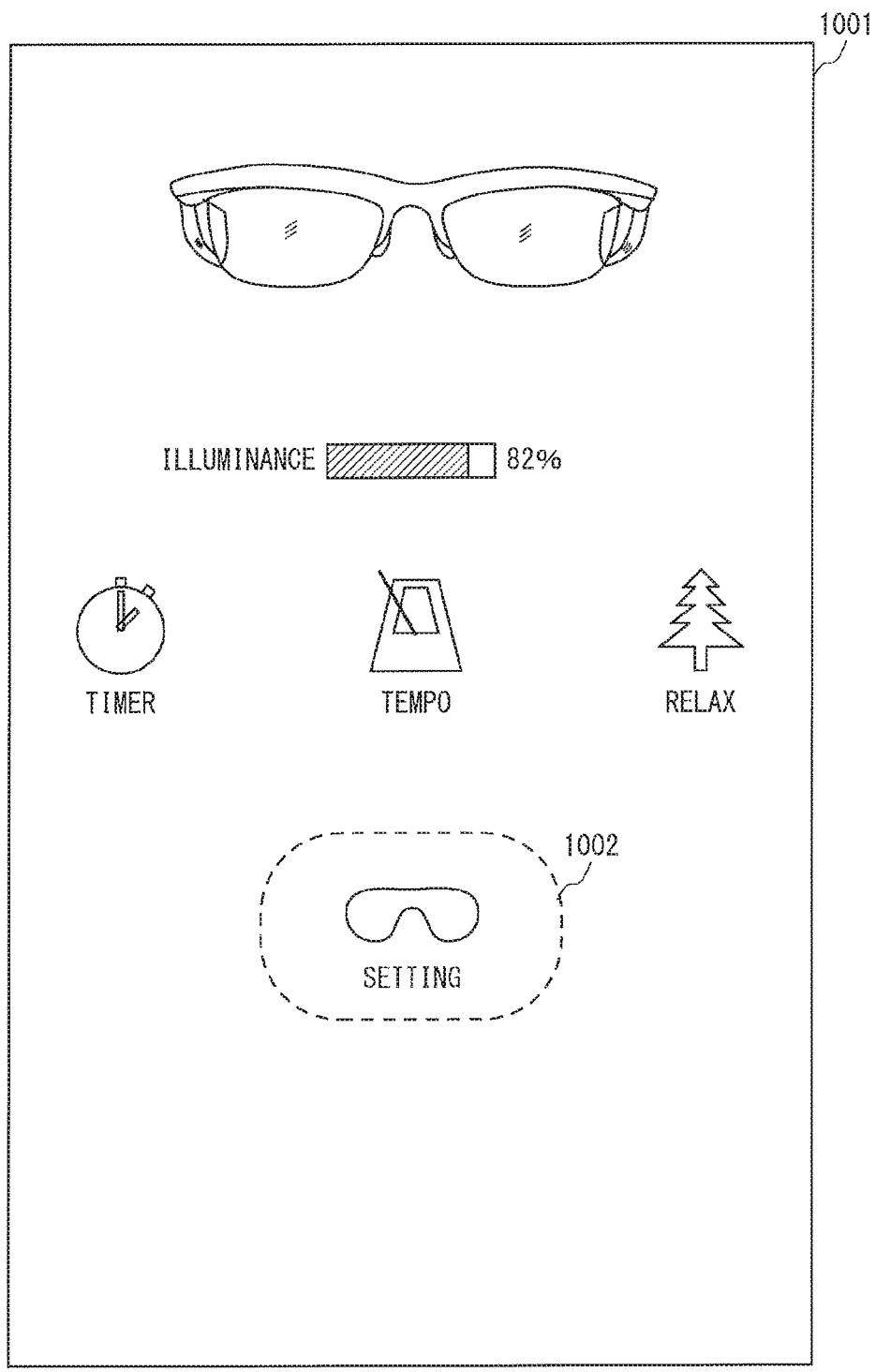
FIG. 10 is an explanatory diagram of a setting menu screen.

The APP icons displayed on the screen of FIG. 10 correspond to "Timer", "Tempo", and "Relax". The "Timer" icon represents an APP configured to output as the action information a time that the wearer is to pay attention to. The "Tempo" icon represents an APP configured to output as the action information a trigger for each fixed time interval to be used for a pace determination, for example. The "Relax" icon represents a so-called relaxation APP. The relaxation APP is configured to output action information for implementing a display mode that is easy on the eyes or that delivers a lot of relaxing emission colors to the eyes of the wearer.

When the "Setting" icon 1002 is selected by the wearer via the screen illustrated in FIG. 10, the touch panel screen switches to an APP setting screen 1101 like that illustrated in FIG. 11. APPs that have already been set are indicated as being "On", and APPs that have not been set are indicated as being "Off". When an "On" APP is selected, the setting content may be changed. When an "Off" APP is selected, the execution situation of the APP corresponding to that icon becomes a new monitoring target. The icons that are illustrated in FIG. 11 are the above-mentioned "Timer", "Tempo", and "Relax" icons. Examples of other APPs include the following.

Figure 12:
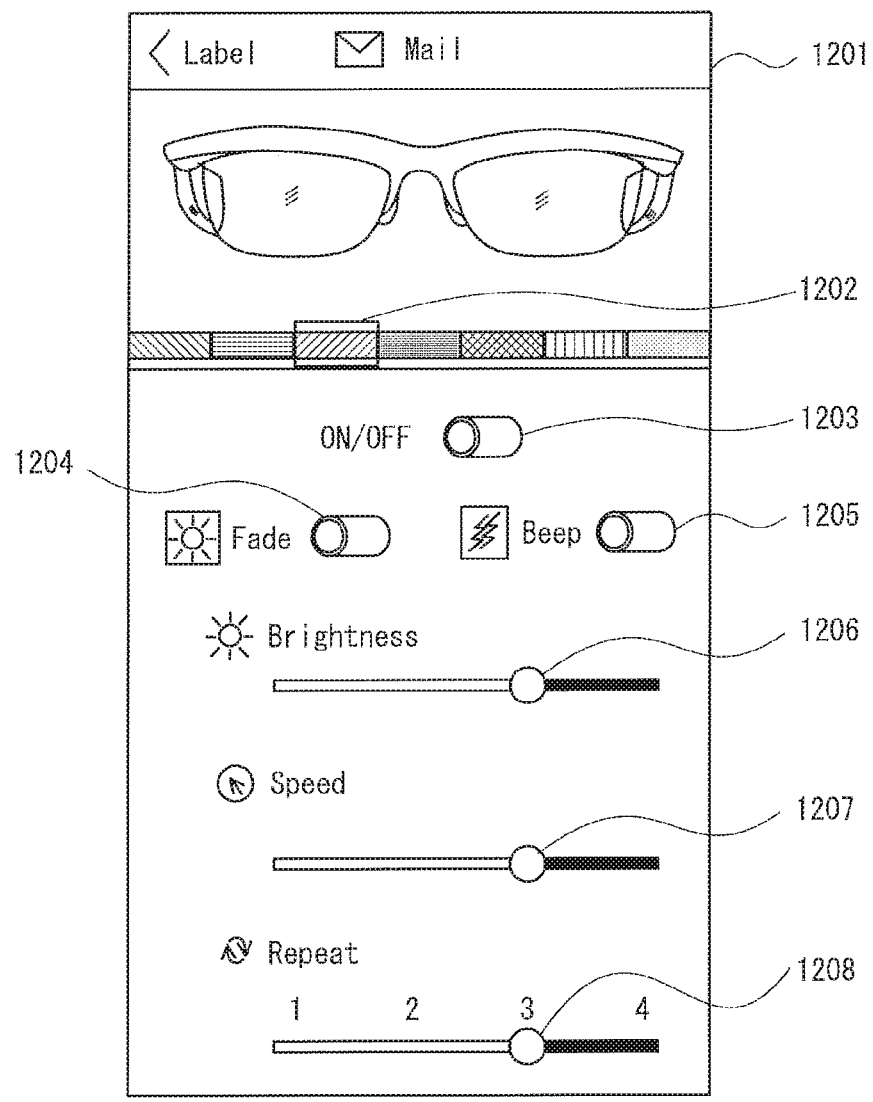
FIG. 12 is an explanatory diagram of a setting content screen for an E-mail.

"Call": Call notification
"Mail": Mail notification
"Social": Message notification
"Calendar": Notification that a set date and time has arrived
"Finance": Notification of a movement in a stock price
"Weather": Notification of a change in the weather
"SOS": Search
"Morse Code": Morse communication
"Disco": Music notification On the APP setting screen 1101 illustrated in FIG. 11, when the "Mail" icon 1102 is selected, the additional note changes from "Off" to "On", and the touch panel screen switches to a setting content screen 1201 for the mail notification illustrated as an example in FIG. 12. On the setting content screen 1201, the following icons and buttons are displayed.

A specification icon 1202 of the color that is to be emitted by the glasses type information terminal 1
An "ON/OFF" button icon 1203 for specifying whether or not to temporarily stop a setting
A "Fade" button icon 1204 for representing that the light intensity gradually changes
A "Beep" button icon 1205 for outputting a beep sound
A "Brightness" button 1206 for specifying the light intensity during light emission
A "Speed" button 1207 for specifying a blinking speed
A "Repeat" button 1208 for specifying the number of times for repeating light emission and sound Returning to FIG. 9, when a desired input based on those indications is received via the setting unit 52 (Step S103: Yes), the control unit 50 determines whether or not the received input is content that has already been transmitted to the glasses type information terminal 1 (Step S104). More specifically, the control unit 50 determines whether or not the received input is a transmission (change transmission) for changing already-set content or for releasing an unset state based on a transmission history to the glasses type information terminal 1. When an input is not received (Step S103: No), or when the received input is not a change transmission (Step S104: No), the control unit 50 returns the processing to Step S103. When the received input is a change transmission (Step S104: YES), the control unit 50 identifies and corrects the pattern ID corresponding to the input setting content, or newly generates a pattern ID, and as a result of that processing generates setting information associating the APP-ID to be monitored and the pattern ID (Step S105). Then, the control unit 50 stores the generated setting information in the tables of the data storage unit 54 (Step S106). When there is another input (Step S107: Yes), the control unit 50 returns the processing to Step S102. When there are no other inputs (Step S107: No), the control unit 50 ends the setting processing. The stored setting information is transmitted to the glasses type information terminal 1 when near field communication to and from the glasses type information terminal 1 is enabled, and the transmitted setting information is synchronized with the association tables 713.

Figure 13:
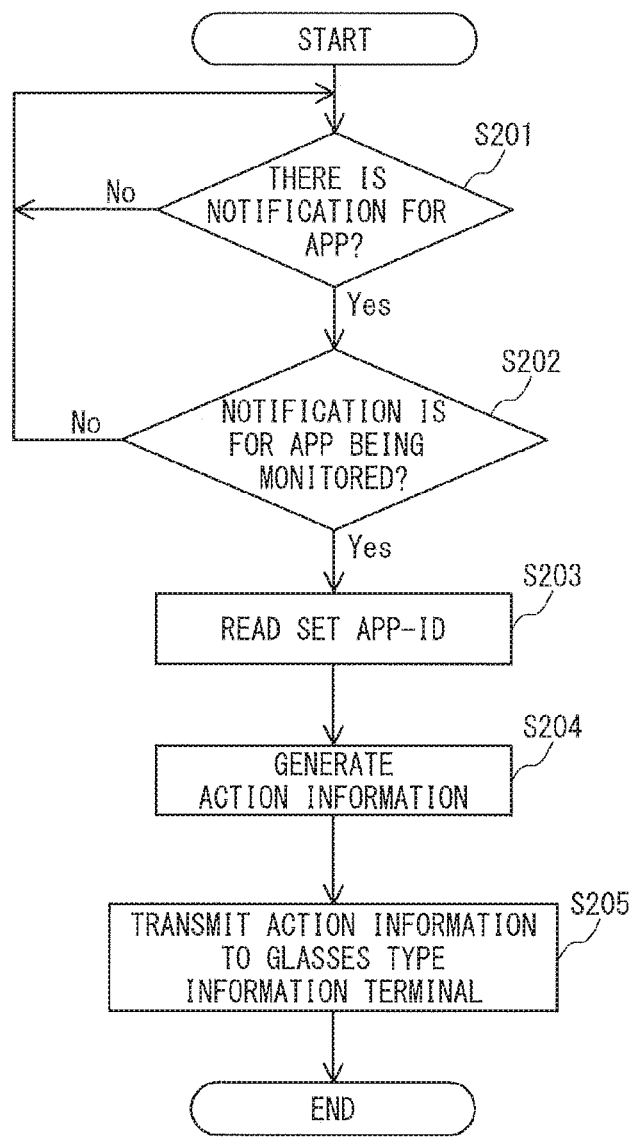
FIG. 13 is a procedure explanatory diagram of generation and transmission of action information by the information processing device.

The control unit 50 generates the action information and transmits the generated action information to the glasses type information terminal 1 based on the monitoring result of the monitoring unit 51 and the stored setting information. A procedure explanatory diagram in such a case is illustrated in FIG. 13. In this case, an example is illustrated of a case in which, in the smartphone 5, a mail notification from outside or a notification based on Internet communication is monitored. In FIG. 13, the control unit 50 waits for a notification from outside by using the monitoring unit 51 (Step S201: No). When a notification is detected (Step S201: Yes), the control unit 50 determines whether or not that notification is addressed to a set APP, namely, is a notification addressed to an APP set as a monitoring target (Step S202). When the notification is not addressed to a set APP (Step S202: No), the control unit 50 returns the processing to Step S201. When the notification is addressed to a set APP (Step S202: Yes), the control unit 50 reads the "APP-ID" of the APP to be monitored (Step S203). Then, the control unit 50 generates action information based on, for example, the read "APP-ID". (Step S204), and transmits the generated action information to the glasses type information terminal 1 (Step S205). After the action information has been transmitted, the control unit 50 stores the transmission history in the data storage unit 54, and ends the processing.

On the APP setting screen 1101 of FIG. 11, when a predetermined event (including an instruction from the wearer) is detected during an execution situation of a non-notification APP, such as "Relax" and "Timer", the processing is not limited to the processing described above. Specifically, when the APP is "Timer", the control unit 50 measures time with an internal clock, identifies the "APP-ID" corresponding to "Timer" when the current time arrives at the time set by the wearer, and then performs the processing of Step S204 onwards. When the APP is "Tempo", after the instruction by the wearer, the control unit 50 immediately identifies the "APP-ID" corresponding to "Tempo", and then performs the processing of Step S204 onwards. The same processing as this is also performed when the APP is "Relax".

Figure 14:
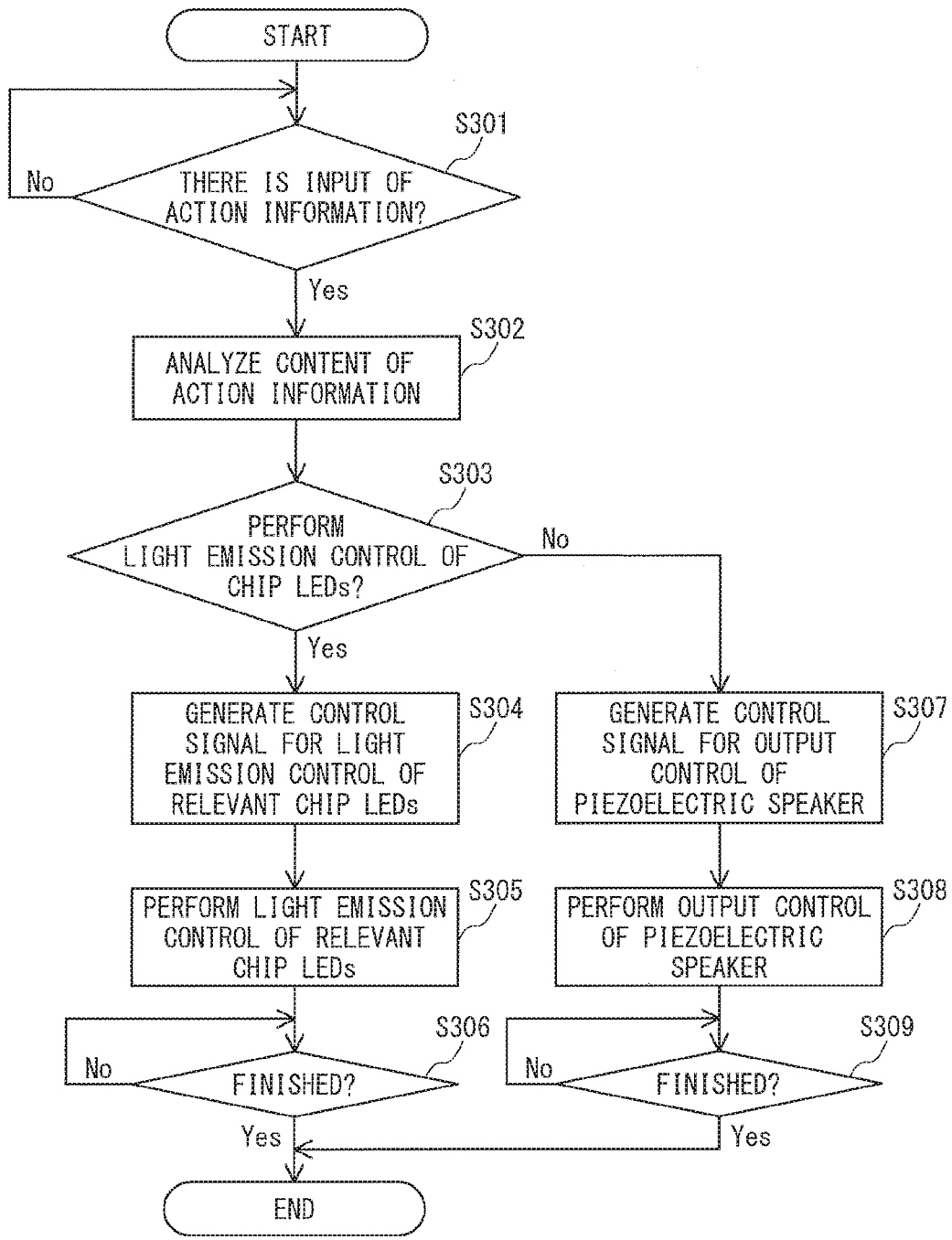
FIG. 14 is an explanatory diagram of a control procedure by the glasses type information terminal based on the action information.

The glasses type information terminal 1 (control module 70) performs light emission control of the chip LEDs 30 and/or output control of the piezoelectric speaker 40 based on the procedure illustrated in FIG. 14. Specifically, after the switch 80 (FIG. 2A) is turned on, the control module 70 waits for input of the action information (Step S301: No). When the action information has been input (Step S301: Yes), the control module 70 analyzes the content of the action information (Step S302). When it is determined based on the analysis that the action information is light emission control information on the chip LEDs 30 (Step S303: Yes), the control module 70 performs light emission control. Specifically, the control module 70 determines the emission color and the emission timing of each chip LED 30, and generates control signals for driving the chip LEDs 30 in that manner (Step S304). Then, the control module 70 emits the signal light by driving the relevant chip LEDs 30 based on those control signals (Step S305). The control module 70 waits for light emission control to finish (Step S306: No), and when the light emission control has finished (Step S306: Yes), ends the processing.

On the other hand, when it is determined based on the analysis result of Step S302 that the action information is not light emission control information on the chip LEDs 30 (Step S303: No), the control module 70 performs output control of the piezoelectric speaker 40. Specifically, the control module 70 generates a control signal in accordance with the sound source data (Step S307). Then, the control module 70 outputs a sound from the piezoelectric speaker 40 based on the control signal (Step S308). The control module 70 waits for output control to finish (Step S309: No), and when the light emission control has finished (Step S309: Yes), ends the processing.

Figure 15:
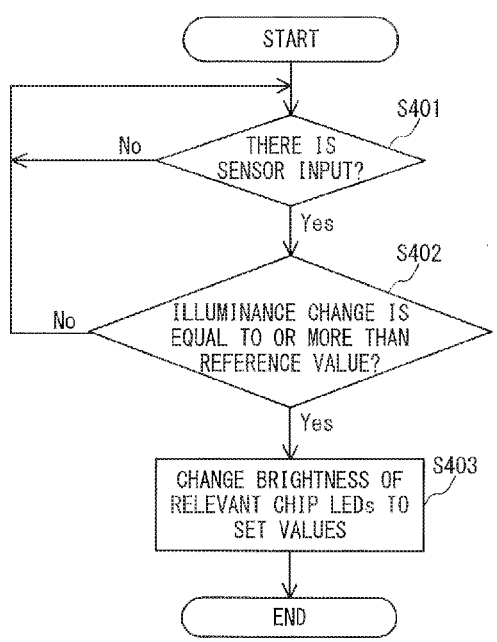
FIG. 15 is an explanatory diagram of a control procedure by the glasses type information terminal based on a sensor result.

When the illuminance change measured by the environment sensor 50 is a fixed value or more, the glasses type information terminal 1 (control module 70) autonomously generates the action information (second light emission control information), and performs light emission control of the chip LEDs 30. The processing procedure of the control module 70 in this case is illustrated in FIG. 15.

Specifically, the control module 70 waits for input from the environment sensor 50 (Step S401: No). When there is input (Step S401: Yes), the control module 70 determines whether or not the illuminance change is equal to or more than a reference range (Step S402). The reference range corresponds to any one of the change IDs (FIG. 6) in the association tables 713. When the illuminance change is less than a minimum reference range (Step S402: No), the control module 70 returns the processing to Step S401. When the illuminance change is in a predetermined reference range, the control module 70 identifies the change ID (FIG. 6) corresponding to that reference range. Then, based on the control pattern associated with the change ID, the control module 70 changes the brightness of the relevant chip LEDs 30 to the set values (Step S403). As a result, for example, the signal light can be recognized more easily by increasing the brightness of the chip LEDs 30 when the surrounding area of the glasses frame 10 becomes brighter than a given reference range.

In the glasses type information terminal 1, the detection result of the control unit 50 may be transmitted to the smartphone, and the action information (third light emission control information) may be generated on the smartphone side. In this case, the processing of Step S402 is performed by the smartphone. The control module 70 of the glasses type information terminal 1 performs the processing of Step S403 based on the received action information.

Thus, with the glasses type information terminal 1 according to this embodiment, the signal light of the light emission mode determined in accordance with the execution situation of an APP loaded in the smartphone 5 is emitted from the chip LEDs 30, and propagated to at least one of the edge surface of the glasses lens 20 and the inner portion of the glasses frame 10. For example, when there is a mail notification from a party X to the smartphone 5, red signal light reaches, for example, the edge surface of the glasses lens 20 three times, and when there is a notification of a change in the price of a stock Y, signal light that slowly gleams blue reaches the edge surface of the glasses lens 20, for example. Because the signal light is scatted by the edge surface of the glasses lens 20, depending on the light emission mode, the overall glasses lens 20 may appear to be gleaming. As a result, even when walking or during a task being focused on, or even when the eyes of the wearer are shut, the wearer can reliably recognize the signal light. In the case of the relaxation APP, the wearer may be allowed to relax by performing light emission control so that the light intensity emitted by the overall glasses lens 20 is easy on the eyes or is a relaxing emission color.

Through loading in the smartphone 5 an APP configured to change the emission color of the overall glasses frame 10, an APP configured to change the coloration of the overall glasses lens 20, an APP capable of sending out information from the wearer to the surrounding area, for example, the glasses type information terminal 1 according to this embodiment may be applied in uses other than alerting the wearer of a notification, for example, to the smartphone 5. For example, through changing the coloration of the glasses frame 10 or the color of the light scattered by the edge surface of the glasses lens 20, information can be sent out to the surrounding area in accordance with the personality or feelings of the wearer, or the current ambience. Through utilizing the point that the signal light is also cast on the face of the wearer, the glasses type information terminal 1 may also be employed in place of makeup to change the appearance of the skin color of the wearer or to cause the eyebrows of the wearer to look thicker. Further, the glasses type information terminal 1 may also be employed to search for or to recognize people in crowded or dark places and to rouse the wearer by using the color or a blinking pattern of the signal light.

With the glasses type information terminal 1 according to this embodiment, the sound of the output mode determined in accordance with the execution situation of an APP is output from the piezoelectric speaker 40. As a result, an APP configured to alert the wearer of information that produces a sense of discomfort in the surrounding area like in the related-art device may be handled by only outputting a sound from the piezoelectric speaker 40, and without performing light emission control of the chip LEDs 30.

Thus, according to this embodiment, implementing the light emission mode of the light-emitting source, such as the chip LEDs 30, and the output mode of a sound by the piezoelectric speaker 40 in combination allows various information to be represented while using a simple configuration capable of reducing costs.

Modified Examples

In the embodiment described above, an example is described in which three chip LEDs 30 are arranged corresponding to each of the pair of glasses lenses 20*a* and 20*b* in the glasses type information terminal 1. However, the number of chip LEDs 30 may be freely selected.

In the embodiment described above, an example is described in which the content corresponding to the association tables 713 is held both by the control module 70 of the glasses type information terminal 1 and by the smartphone 5. However, those tables may be stored by only the smartphone 5. In this case, the standards, for example, of the chip LEDs 30 and the piezoelectric speaker 40 of the glasses type information terminal 1 are input in advance in the smartphone 5, and the smartphone 5 generates the action information for controlling the chip LEDs 30 and the piezoelectric speaker 40.

In another case, the association tables 713 may be stored just by the control module 70 of the glasses type information terminal 1. In this case, the content of those association tables 713 is utilized by the smartphone 5, and only the pattern ID is transmitted to the glasses type information terminal 1 as information to be presented.

In the embodiment described above, an example is described in which, for one glasses lens, the light-emitting surface of one chip LED 30*b* is directed toward a lower edge surface of the glasses lens 20*a*, and the light-emitting surfaces of the other two chip LEDs 30*a* and 30*c* are directed directly upward. However, the present invention is not limited to this example. The light-emitting surfaces of all the chip LEDs 30 may be arranged facing in a downward direction. Further, in the case that the light reaches the glasses lenses even without arranging the opening 111*b*, it is not necessary to form the opening 111*b*. From the perspective of increasing directivity, a reflective film may be arranged on a rear side of the light-emitting surfaces of the chip LEDs 30.

In the embodiment described above, an example is described in which the environment sensor 50 is an illuminance sensor. However, when an acceleration sensor or an angular velocity sensor is used as the environment sensor 50, an even wider range of usages is possible. For example, control can be performed for representing the display mode of the chip LEDs 30 or the output mode of the piezoelectric speaker 40 in accordance with the posture of the wearer.

In the embodiment described above, an example is described in which the glasses type information terminal 1 is configured to store the sound source data and to perform output control of the piezoelectric speaker 40 based on that sound source data. However, the present invention is not limited to this example. The present invention may also be implemented by utilizing the glasses type information terminal 1 as a wireless earpiece of the smartphone 5. In this case, the control module 70 is configured to receive a wireless signal representing an output sound of the smartphone 5 from the smartphone 5 via the communication module 60. The output sound is extracted from the received wireless signal, and the extracted output sound is output from the piezoelectric speaker 40.

REFERENCE SIGNS LIST

1 . . . glasses type information terminal, 5 . . . smartphone, 10 . . . glasses frame, 20*a*, 20*b* . . . glasses lenses, 30 (30*a*~30*f*) . . . chip LED, 40 . . . piezoelectric speaker, 50 . . . environment sensor, 70 . . . control module, 80 . . . switch, 90 . . . battery

The invention claimed is:

1. A glasses type information terminal, comprising:
    a glasses frame capable of holding a glasses lens to be used by a wearer in everyday activities;
    a light-emitting source of provided at an upper portion of the glasses frame for emitting signal light toward a lower edge surface of the glasses lens; and
    a control module configured to perform, when triggered by input of light emission control information representing a light emission mode of the signal light, light emission control of the light-emitting source based on the light emission control information,
    the glasses type information terminal being configured such that the signal light of the light emission mode is propagated from the light-emitting source toward the lower edge surface of the glasses lens without passing through the glasses frame, and the signal light of the light emission mode is scattered by the lower edge surface to a surrounding area.

2. The glasses type information terminal according to claim 1, wherein the signal light is configured to flash at least at an edge surface lower than an eyelevel of the wearer.

3. The glasses type information terminal according to claim 1, further comprising
    a communication module configured to perform wireless communication to and from an external device, which is configured to select any one of a plurality of applications including an application for sending out information other than information on a state notification of the glasses type information terminal, and to set the light emission mode in accordance with an execution situation of the selected application,
    wherein the control module is configured to input, via the communication module, the light emission control information representing the light emission mode set by the external device.

4. The glasses type information terminal according to claim 3, further comprising an environment sensor configured to detect a change in a surrounding environment of the glasses frame,
    wherein the control module is configured to transmit a detection result of the environment sensor to the external device via the communication module, and to receive and input the light emission control information determined in accordance with the detection result from the external device.

5. The glasses type information terminal according to claim 3,
    wherein the glasses frame comprises a temple portion,
    wherein, in the temple portion, a speaker configured to output a predetermined sound is accommodated in a site directing to an ear of the wearer, and
    wherein the control module is configured to receive from the external device a wireless signal representing an output sound of the external device, to extract the output sound from the received wireless signal, and to output the extracted output sound from the speaker.

6. An information processing device, comprising:
communication means for performing communication to and from the glasses type information terminal of claim 3;
setting means for selecting any one of a plurality of applications including an application for sending out information other than information on a state notification of the glasses type information terminal, and setting the light emission mode in accordance with an execution situation of the selected application;
monitoring means for monitoring the execution situation of the application; and
control means for generating light emission control information representing the light emission mode set by the setting means in accordance with the monitored execution situation, and transmitting the generated light emission control information to the glasses type information terminal via the communication means.

7. The information processing device according to claim 6,
wherein the glasses type information terminal comprises a temple portion,
wherein, in the temple portion, a speaker configured to output a predetermined sound is accommodated in a site directing to an ear of the wearer,
wherein the control module is configured to store a plurality of pieces of sound source data, and to implement, when triggered by input of sound control information representing an output mode of the predetermined sound to be produced by the speaker by using the plurality of pieces of sound source data, the output mode by performing output control of the speaker based on the sound control information,
wherein the setting means is configured to set an output mode of the speaker in accordance with the execution situation of the selected application, and
wherein the control means is configured to generate the sound control information in accordance with the monitored execution situation, and to transmit the generated sound control information to the glasses type information terminal via the communication means.

8. A non-transitory, computer readable recording medium containing a computer program for causing a computer comprising a communication function to operate as the information processing device of claim 6.

9. The glasses type information terminal according to any one of claim 1 wherein the light-emitting source comprises a plurality of light-emitting devices each configured to be individually controlled and capable of emitting color light in one or more colors, and
wherein the control module is configured to cause the signal light to be emitted from the light-emitting source by controlling a drive timing of each of the plurality of light-emitting devices based on the light emission control information.

10. The glasses type information terminal according to claim 9,
wherein one or more of the plurality of light-emitting devices are configured to emit light toward an inner portion of the glasses frame,
wherein the glasses frame is built from a color-emitting member configured to emit a color in accordance with a color of input light, and
wherein the control module is configured to determine an emission color of the one or more of the plurality of light-emitting devices configured to emit light toward an inner portion of the glasses frame based on the light emission control information, and to enable a color of the glasses frame to be changed based on the determination.

11. The glasses type information terminal according to claim 1, further comprising an environment sensor configured to detect a change in a surrounding environment of the glasses frame,
wherein the control module is configured to generate a second light emission control information, which represents a light emission mode and is different from the light emission control information, in accordance with a detection result of the environment sensor, and to perform light emission control of the light-emitting source based on the second light emission control information.

12. The glasses type information terminal according to claim 1,
wherein the glasses frame comprises a temple portion,
wherein, in the temple portion, a speaker configured to output a predetermined sound is accommodated in a site directing to an ear of the wearer, and
wherein the control module is configured to store a plurality of pieces of sound source data, and to implement, when triggered by input of sound control information representing an output mode of the predetermined sound to be produced by the speaker by using the plurality of pieces of sound source data, the output mode by performing output control of the speaker based on the sound control information.

* * * * *